United States Patent [19]

McKay et al.

[11] 4,024,218
[45] May 17, 1977

[54] PROCESS FOR HYDROMETALLURGICAL UPGRADING

[75] Inventors: Donald Roderick McKay; Ernest George Parker, both of Rossland, Canada

[73] Assignee: Cominco Ltd., Vancouver, Canada

[22] Filed: Nov. 3, 1975

[21] Appl. No.: 628,298

[52] U.S. Cl. .................................. 423/26; 423/37; 423/95; 423/98; 423/101; 423/109; 423/140; 423/145; 423/146; 423/150; 423/555; 423/561 B

[51] Int. Cl.² ..................... C01G 3/12; C01G 9/08; C01G 51/00; C01G 53/00

[58] Field of Search .......... 423/140, 145, 146, 150, 423/26, 27, 36, 37, 95, 98, 101, 109, 166, 561; 75/101 R, 117, 119, 120

[56]  References Cited
UNITED STATES PATENTS

| | | | |
|---|---|---|---|
| 3,053,651 | 9/1962 | McGauley | 423/150 |
| 3,316,059 | 4/1967 | Vizsolyi et al. | 423/95 |
| 3,375,066 | 3/1968 | Murakami et al. | 423/166 |
| 3,544,306 | 12/1970 | McGauley | 423/26 |
| 3,741,752 | 6/1973 | Evans et al. | 423/150 |
| 3,816,105 | 6/1974 | McKay et al. | 423/37 |
| 3,891,522 | 6/1975 | McKay | 423/36 |
| 3,909,248 | 9/1975 | Ryan et al. | 423/150 |
| 3,957,602 | 5/1976 | Johnson et al. | 423/37 |

Primary Examiner—O. R. Vertiz
Assistant Examiner—Brian E. Hearn

Attorney, Agent, or Firm—Arne I. Fors

[57] ABSTRACT

This invention relates to a process for hydrometallurgical treatment of concentrates of sulphides of copper, nickel, cobalt, lead and iron and copper-containing mattes. A first embodiment of the process includes subjecting a finely ground slurry of a sulphide concentrate to an oxidation leach at elevated temperature and pressure in the presence of an oxygen-bearing gas to preferentially leach cobalt and nickel and to convert galena to lead sulphate. The reaction mixture is heated to a further elevated temperature, in the absence of oxygen, to convert a portion of chalcopyrite to insoluble simple copper sulphides and ferrous sulphate solution and to decompose complex insoluble ferric compounds. The resulting mixture is subjected to differential flotation whereby a lead concentrate and a copper concentrate are obtained. The solution is reduced in acid content by addition of limestone, the iron is precipitated and removed, and nickel and cobalt are precipitated in the remaining solution as sulphides and recovered as a concentrate.

The second embodiment of the process includes subjecting a copper-containing matte to an oxidation leach at elevated temperature and under pressure of an oxygen-bearing gas whereby a copper sulphate-containing solution is formed for use in the process of the first embodiment and solids residue is recovered as a concentrate.

22 Claims, 2 Drawing Figures

PROCESS FOR HYDROMETALLURGICAL UPGRADING

BACKGROUND OF THE INVENTION

This invention relates to a process for the hydrometallurgical treatment of concentrates containing metal values and, more particularly, relates to a process for the hydrometallurgical treatment and upgrading of concentrates containing sulphides of non-ferrous metals and of mattes containing non-ferrous metals.

Many processes are known for the hydrometallurgical extraction of non-ferrous metal values such as nickel and copper values from sulphide ores and concentrates. The presence of iron, however, such as in chalcopyrite can require separate pyrometallurgical treatment of the ores and concentrates as an adjunct to known hydrometallurgical processes to cope with the iron values, resulting in possible pollution of the environment. Otherwise, the presence of iron values can lead to undesirable production of acid and to difficulty in copper and sulphur recovery.

In addition, treatment of complex sulphides containing copper, nickel, lead, cobalt and zinc can be difficult to effect for separate recovery of the metals. For example, insoluble lead, copper and zinc-containing complex ferric compounds can be formed which impede or prevent separation of metal values.

STATEMENT OF INVENTION

The process of our invention substantially obviates the foregoing disadvantages of known processes. In accordance with one embodiment of the process, finely ground concentrate containing chalcopyrite, galena, sphalerite and cobalt and nickel sulphides is slurried and subjected to an oxidation leach at elevated temperature and pressure in the presence of an oxygenbearing gas to preferentially leach cobalt and nickel and to convert galena to lead sulphate. The reaction mixture is subjected to a further elevated temperature, in the absence of oxygen, to convert a portion of the chalcopyrite to insoluble simple copper sulphides and ferrous sulphate solution and to decompose complex insoluble ferric compounds. The resulting mixture is subjected to differential flotation whereby a lead concentrate and a copper concentrate are obtained. The solution is reduced in acid content by addition of limestone, the iron is precipitated and removed, and nickel and cobalt are precipitated in the remaining solution as sulphides and recovered as a concentrate.

It is an important object of the present invention to separate metal values in concentrates into clear fractions which can be readily separately treated for the enhanced recovery of the said metal values.

It is another object of the invention to preferentially leach cobalt and nickel from a chalcopyrite-containing concentrate.

Another object is to convert galena to a form which can be easily separated from copper sulphides.

Still another object is to convert highly insoluble lead, copper and zinc-containing complex ferric compounds to simple compounds which enable the separation of metal values.

In a second embodiment of the process of the invention, a copper-containing matte is subjected to an oxidation leach at elevated temperature and under pressure of an oxygen-bearing gas whereby a copper sulphate-containing solution is formed for use in the process of the first embodiment and a solids residue is recovered as a concentrate.

It is another object of the present invention to treat mattes in combination with the treatment of concentrates to separate the metal values contained in both the mattes and concentrates into fractions.

Another object of the invention is the provision of a hydrometallurgical process for the elimination of economic penalties which are incurred when mattes or concentrates are sold or are treated by pyrometallurgical methods.

A further object of the invention is to utilize the iron in chalcopyrite contained in a concentrate to recover the copper content of a matte.

BRIEF DESCRIPTION OF THE DRAWINGS

These and other objects of the invention and the manner in which they can be attained will become apparent from the following description of the process of the invention with reference to the accompanying drawings, in which.

DESCRIPTION OF THE PREFERRED EMBODIMENTS OF THE INVENTION

Concentrates which can be treated according to the process of the present invention comprise chalcopyrite and chalcopyrite-containing copper sulphides such as bornite, covellite and chalcocite, galena, sphalerite, cobalt and nickel sulphides such as siegenite, minor amounts of compounds of arsenic and antimony, and precious metals. Mattes which can be treated according to the process of the invention may contain copper, lead, sulphur, cobalt, nickel, zinc, iron, arsenic, antimony and precious metals.

Figure 1:
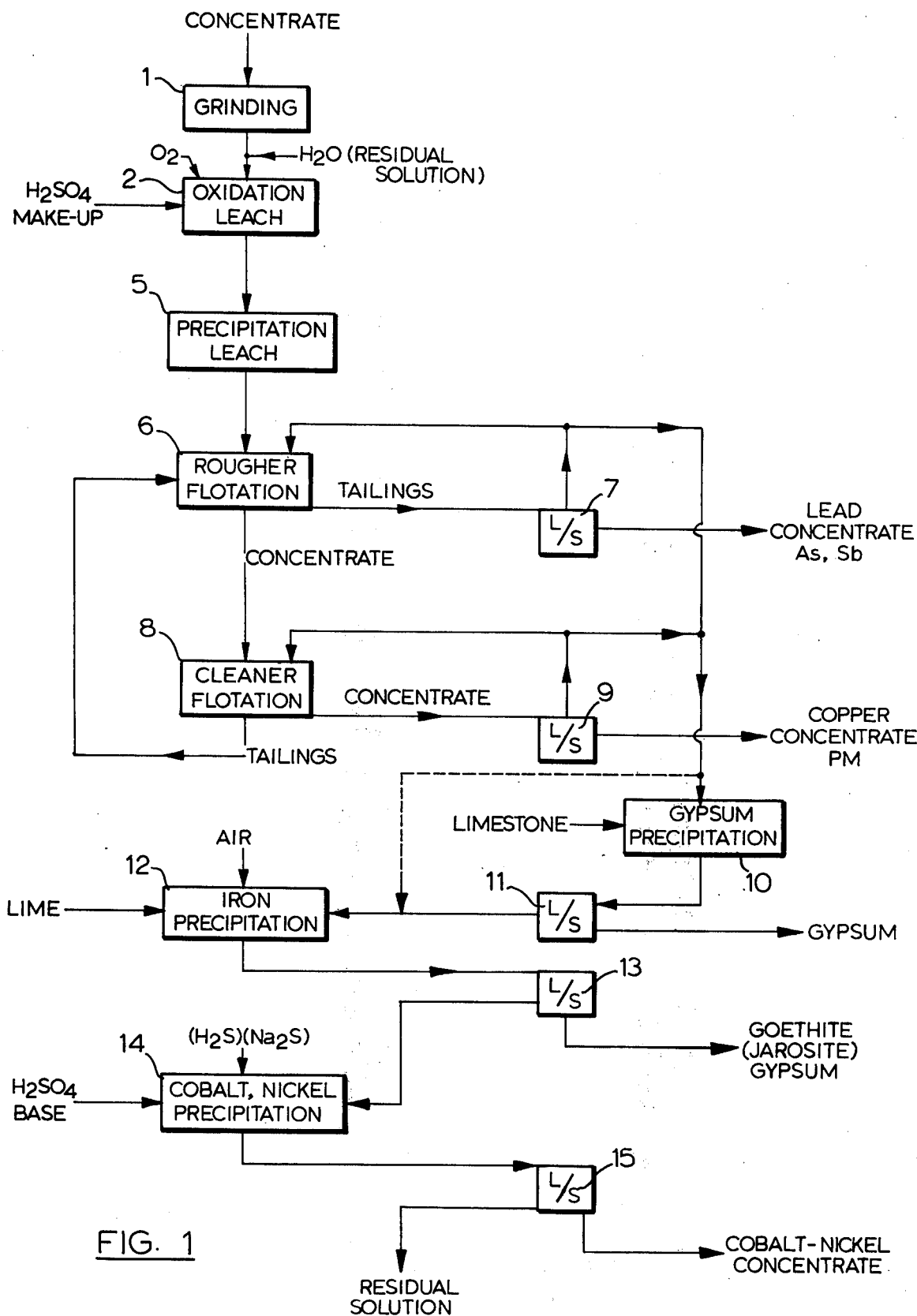
FIG. 1 is a simplified flow diagram of one embodiment of the process.

With reference to FIG. 1, concentrate is fed to grinding step 1 wherein the concentrate is ground so that from about 90 to 100% by weight of ground concentrate passes a 325 mesh screen (Tyler series). The grinding step is essential to obtain efficient extraction in the subsequent leaching step. A coarser material can be used but this generally results in longer leaching times.

The ground concentrate is slurried with water, or with residual solution from the process, as will be described hereinbelow, and fed to oxidation leach 2. In oxidation leach 2, the slurried ground concentrate is leached at an elevated temperature and under pressure of an oxygen-bearing gas in the presence of a controlled amount of sulphuric acid to selectively leach nickel and cobalt from the concentrate, while retaining most of the copper in the solids.

We have found that by raising the partial pressure of oxygen in the oxidation leach and maintaining said partial pressure in the range of from about 50 to 200 pounds per square inch (p.s.i.), the leaching rate of cobalt and nickel increases while the leaching rate of copper from the chalcopyrite remains at a low value, permitting extractions of up to 85% of the cobalt and nickel in the concentrate. The preferred partial pressure of oxygen is in the range of from about 100 to 200 p.s.i. whereby 70 to 85% of the cobalt and nickel are leached.

The temperature in the oxidation leach is maintained in the range of from about 70° C. to the melting point of sulphur, preferably in the range of from about 90° to 115° C.

The amount of free acid in the leach must be carefully controlled to keep the amount of copper which leaches from the concentrate at a minimum. We have found that with an amount of free acid equivalent to from about 10 to 70 grams per liter (g/l) sulphuric acid an amount of from about 5% to not more than 20% of the copper in the concentrate reacts. The copper in the concentrate, which is present as chalcopyrite, will dissolve only to a small degree, but copper present in the form of covellite, chalcocite or bornite will react and go into solution.

The retention time of the reaction mixture in oxidation leach 2, conducted continuously, may vary in the range of from about one to five hours.

Any zinc present in the concentrate will dissolve, while lead present will form insoluble lead sulphate and remain in the leach residue with precious metals, arsenic and antimony.

We have found that lead, copper, zinc and iron will tend to form insoluble complex ferric iron-containing compounds of the jarosite type in the oxidation leach. Compounds such as plumbo jarosite and a cuproplumbo jarosite have been identified and are present in measurable quantities in the leach residue. Special treatment is necessary to liberate the metal values from these highly insoluble and stable compounds.

Figure 2:
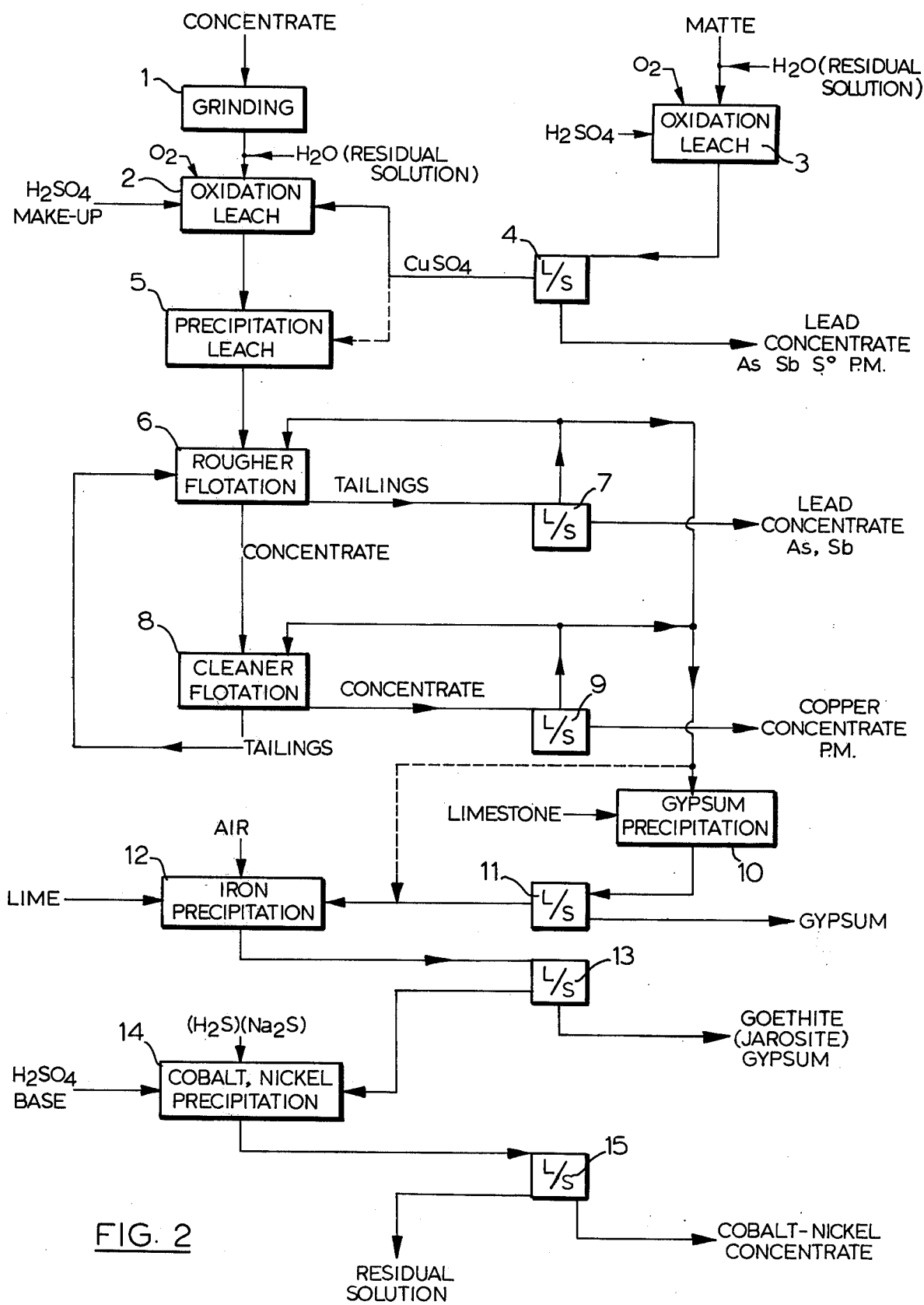
FIG. 2 is a flow diagram illustrating a second embodiment of the process of the invention in combination with the process shown in FIG. 1.

We have found that the addition of a copper sulphatecontaining solution to the oxidation leach 2 has a beneficial effect on the preferential leaching of the cobalt and the nickel from the concentrates. The addition of copper sulphate solution increases the extraction of cobalt and nickel from about 85 to 95%. The copper sulphate solution may contain from about 20 to 80 g/l copper as cupric ion and may be prepared by a number of methods such as, for example, by dissolving copper sulphate in an aqueous solution or by leaching copper ore with or dissolving copper metal or scrap in sulphuric acid. In a preferred second embodiment of the process according to the invention, as shown in FIG. 2, the copper sulphate-containing solution is obtained from copper-containing matte by concurrent oxidation leach 3, as is described hereinbelow.

Copper-containing matte is slurried with water or residual solution and the slurry is subjected to the oxidation leach 3 in which the slurried matte is treated with sulphuric acid and an oxygen-bearing gas at elevated temperature and pressure to dissolve the copper and any cobalt, nickel and zinc. The matte is usually in a particulate form with a particle size of less than 10 mesh. If desired, the matte may be subjected to a grinding operation prior to being slurried with water or residual solution (to be described) to reduce the particle size which may increase the rate and degree of extraction and thus reduce the retention time in the oxidation leach 3.

Oxidation leach 3 is carried out at a temperature in the range of from about 100° to 115° C. and under a partial pressure of oxygen in the range of from about 100 to 200 p.s.i. The retention time is less than five hours and usually from one to two hours. Sufficient sulphuric acid must be added to give a high extraction of copper while any lead and precious metals remain in the solid leach residue, arsenic and antimony compounds being partly dissolved. A residual acid content of from about 5 to 20 g/l in the leach solution is desired.

To obtain fast dissolution of the copper, the presence of some iron in the slurry during the leach is desirable. An amount of from about 2 to 10 g/l iron as ferrous sulphate, preferably from about 2 to 5 g/l, added to the oxidation leach 3, which is either added as a ferrous sulphate solution or which is present in the residual solution used for slurrying the matte, reduces the retention time of the matte slurry in the oxidation leach from about five to about one to two hours.

Under the foregoing conditions in the matte oxidation leach 3, at least 90% and up to 99% of the copper in the matte and all cobalt, nickel and zinc are extracted.

The leach solution obtained from matte oxidation leach 3 contains copper, cobalt, nickel and zinc, while the solid leach residue is a lead concentrate containing lead sulphate, as well as substantially all precious metals, arsenic, antimony and sulphur originally present in the matte. After a liquid-solids separation 4, the lead concentrate may be further treated for the recovery of values therefrom while at least a portion of the copper-containing solution, in which the copper is in the form of copper sulphate, may be fed to oxidation leach 2.

The amount of free acid in leach 2 must be controlled at 10 to 70 g/l sulphuric acid and, because the copper-containing solution fed to oxidation leach 2 contains from about 5 to 20 g/l of sulphuric acid, an amount of sulphuric acid may be added to oxidation leach 2 to bring the free acid content in the leach to within the preferred range. It is understood that in some cases it will not necessary to add sulphuric acid to leach 2.

The reaction mixture from oxidation leach 2 is fed to precipitation leach 5, together with any of the copper-containing solution from liquid-solids separation 4 which is not fed to oxidation leach 2, as indicated by the broken line in the flowsheet of FIG. 2. The reaction mixture from leach 2 contains the major portion of the chalcopyrite in the concentrate, lead sulphate, the insoluble jarosites and other ferric compounds formed in oxidation leach 2, arsenic and antimony compounds, precious metals and dissolved sulphates of copper, cobalt, nickel, zinc and iron. In precipitation leach 5, dissolved copper is precipitated as simple copper sulphides and the jarosites and other ferric compounds are decomposed, while the form of the other values mentioned above remains unchanged.

Precipitation leach 5 is performed under autogenous pressure without the addition of an oxygen-bearing gas, i.e. in the absence of free oxygen, and at a temperature in the range of from about 140° to 190° C., preferably in the range of from about 150° to 180° C. The retention time is in the range of from about one to five hours.

The copper sulphate in the reaction mixture, originating either from leach 2, or 3, or both, reacts with at least a portion of the chalcopyrite whereby iron and sulphur are displaced with the formation of insoluble simple copper sulphides and ferrous sulphate in solution. The remaining portion of chalcopyrite does not react. The above mentioned jarosites and other ferric compounds are decomposed with the liberation and subsequent precipitation of lead as lead sulphate and of copper as copper sulphide, and with the dissolution of iron as ferrous sulphate.

Precipitation leach 5 is essential in the process to decompose the complex iron compounds and to make it possible to separate the metal values, each contained in a separate fraction which can be further treated for the recovery of the metal.

The reaction mixture from precipitating leach 5, which contains simple solid copper sulphides, residual chalcopyrite, lead sulphate and a solution containing cobalt, nickel, zinc and ferrous-sulphate and sulphuric acid, is subjected to differential flotation to separate a lead concentrate and a copper concentrate therefrom, as shown in FIG. 1. In rougher flotation step 6, the reaction mixture is separated into a concentrate containing the copper-containing compounds and into tailings containing the lead sulphate and arsenic and antimony compounds. The tailings are subjected to liquid-solids separation 7, the solids fraction being a lead sulphate containing concentrate of high purity. A portion of the liquid fraction is returned to the rougher floation 6 to control the flotation pulp density, while the remaining portion is forwarded to a gypsum precipitation step, to be described.

The concentrate from step 6 is subjected to a cleaner flotation 8 which yields a concentrate and tailings. The tailings are returned to rougher flotation 6 and the concentrate is subjected to a liquid-solids separation 9. The solids fraction from separation 9 is a copper-containing concentrate which also contains the precious metals which were present in the original concentrate. The copper concentrate may be further treated to recover its metal values. A portion of the liquid fraction from separation 9 may be returned to flotation 8 to control the pump density while the remainder is forwarded to a gypsum precipitation step, to be described.

We have found that rougher flotation 6 and cleaner flotation 8 usually can be operated without the addition of collecting and/or frothing reagents. In some cases a small amount of reagent, of types well known in the art, may be added if desired.

Some copper which may be dissolved in the flotation steps can be precipitated, for example, by addition of hydrogen sulphide, and recovered. It is desirable to retain a small amount of copper of, for example, 0.5 to 1 g/l in the solution as will be described below.

The portions of the liquid fractions from liquidsolids separations 7 and 9 which are not returned to the flotation steps are combined and fed to the gypsum precipitation 10, wherein the acidity of the solution is reduced by the addition of limestone. A sufficient quantity of limestone is added to raise the ph of the solution to about 1.5 to 2.0.

After separation of the precipitated gypsum in a liquid-solids separation 11, the solution is fed to iron precipitation 12 wherein the solution is treated at elevated temperature and at atmospheric pressure with air and lime, whereby the iron in the solution is substantially precipitated as goethite (hydrated ferric oxides). The temperature of the reaction is maintained in the range of from about 60° to 95° C., preferably at a temperature of about 75° C. A sufficient amount of lime is added during the reaction to raise and maintain the pH of the reaction mixture at a value in the range of from about 2.0 to 3.5, preferably in the range of from about 2.6 to 2.9. Vigorous agitation of the reaction mixture is necessary. The retention time is in the range of from four to eight hours.

For substantially complete precipitation of the iron it is necessary that a small amount of cupric ion is present in the solution, for example from about 0.5 to 1.0 g/l. This small amount of cupric ion can be added to the solution prior to the iron precipitation, or may be present in the solution from the flotation steps as described above.

As alternative methods for the precipitation of iron, the solutions from liquid-solids separations 7 and 9 may be fed directly to the iron precipitation step, as shown by the broken line, wherein the iron is treated with an oxygen-bearing gas at elevated temperature to precipitate iron as a basic sulphate or hematite, or, in the presence of an alkali metal or ammonia, as a jarosite. These alternative methods use pressure equipment and involve the use of oxygen at partial pressures in the range of from about 50 to 200 p.s.i. and at temperatures in the range of from about 140° to 230° C.

The reaction mixture from iron precipitation 12 is separated in liquid-solids separation 13 into a solids fraction containing goethite or, alternatively, basic sulphate or jarosite, and gypsum and a liquid fraction which contains the nickel and cobalt as well as zinc and a small amount of residual iron and copper. The amount of residual iron ranges from one to seven g/l but is normally less than five g/l.

The cobalt and nickel as well as the zinc and copper in the liquid fraction are precipitated as sulpides in cobalt, nickel precipitation 14. The cobalt and nickel sulphides may be precipitated from the sulphate solution with hydrogen sulphide gas, sodium sulphide, ammonium sulphide or any other convenient soluble sulphide. The sulphides are precipitated at atmospheric pressure at a temperature in the range of from about 50° C. to the boiling point of the solution, preferably from about 60° to 70° C., and at pH in the range of from about 1.8 to 4.5, preferably from about 2.5 to 3.0. The precipitation of cobalt and nickel sulphides is rapid and is essentially complete.

When using hydrogen sulphide to precipitate the sulphides the pH of the solution is maintained within the above cited ranges by the addition of an alkali such as, for example, sodium hydroxide, ammonium hydroxide, or ammonia. When using an alkali sulphide such as sodium or ammonium sulphide to precipitate the sulphides, the desired pH is maintained by the addition of an acid, preferably sulphuric acid, to prevent precipitation of iron sulphide.

If so desired, copper and zinc present in the solution to be fed to precipitation 14 may be removed prior to the precipitation of cobalt and nickel. Copper and zinc are precipitated with hydrogen sulphide at ambient pressure and temperature to prevent precipitation of cobalt and nickel and the precipitated sulphides are removed from the solution.

The precipitated cobalt and nickel sulphide are separated from the residual solution in liquid-solids separation 15. The cobalt and nickel sulphide form a concentrate which may be further processed to recover the metal values.

The residual solution, which is essentially neutral and which contains only up to about 5 g/l ferrous sulphate, is recycled for the slurrying of concentrate and matte, to maintain the water balance in the process, to act as washing liquid for the solids fractions in the various liquid-solids separations and to provide the small amounts of dissolved iron required in the oxidation leach 3. Any excess of residual solution as well as residual wash solutions are treated prior to disposal.

The liquid-solids separations in the process are conducted by conventional methods such as settling, filtration, pressure filtration or centrifuging. If and where necessary the solids fractions may be washed with residual solution which is returned as recycle to the process.

The following illustrative examples are given to provide a fuller understanding of the process of our invention.

EXAMPLE 1

In this example, ground concentrate was subjected to an oxidation leach followed by flotation without an intervening precipitation leach. Concentrate containing about 26% Cu, 11.5% Pb, 25% Fe, 32% S, 0.7% Ni and 0.4% Co, was ground so that 99% by weight passed a 325 mesh screen. 1000 g. of the ground concentrate was slurried in 1.5 l. of a solution containing 100 g/l sulphuric acid. The slurry was subjected to an oxidation leach at 110° C., under partial pressure of oxygen of 100 p.s.i. and with a retention time of 3 hours. The reaction mixture from the oxidation leach was subjected to a rougher flotation and a cleaner flotation without the addition of reagents. The concentrate from each flotation was filtered and the solids washed. The tailings were washed and combined. The results of the flotation are tabulated in Table I below, wherein the float concentrate is a copper concentrate and the float tailings, consisting of washed and combined tailings, is a lead concentrate. Metal distribution in the combined filtrates are included in the Table. It was determined by X-ray diffraction that lead in the float concentrate was present as a plumbo jarosite and that copper in the tailings was present as a cuproplumbo jarosite.

dation leach under the same conditions as in Example 1 and the reaction mixture from the oxidation leach was subjected to a precipitation leach for 2.5 hours at 160° C. The resulting slurry was then subjected to a rougher flotation and a cleaner flotation as in Example 1. The results are tabulated in Table II.

It will be evident from a comparison of results shown in Table I and Table II that the distribution of metals in the float concentrate (copper concentrate), the tailings (lead concentrate) and the leach filtrate (flotation solution) when a precipitation leach is used prior to flotation is greatly improved over the distribution when no precipitation leach is used and flotation immediately follows the oxidation leach. The copper contained in the leach filtrate is only 0.2% of the amount in the concentrate when the precipitation leach is used, while the lead concentrate contains only 0.1% of the original copper and 0.3% each of the original cobalt and nickel in the concentrate. The considerable increase in the lead content of the lead concentrate and in the copper content of the copper concentrate of Example 2 over Example 1 clearly shows the elimination of the insoluble complex ferric compounds formed in the oxidation leach.

TABLE II

| material | weight or volume | assay in % or g/l | | | | | distribution in % of concentrate | | | | |
|---|---|---|---|---|---|---|---|---|---|---|---|
| | | Cu | Ni | Co | Fe | Pb | Cu | Ni | Co | Fe | Pb |
| Feed concentrate | 1000 g | 26.6 | 0.67 | 0.34 | 25.2 | 11.8 | 100 | 100 | 100 | 100 | 100 |
| solution | 1.5 l | — | — | — | — | — | — | — | — | — | — |
| Flotation concentrate | 738 g | 35.9 | 0.16 | 0.08 | 23.7 | 1.0 | 99.7 | 17.6 | 16.7 | 69.3 | 0.6 |
| tailings | 179 g | 0.2 | 0.01 | 0.01 | 0.2 | 65.5 | 0.1 | 0.3 | 0.3 | 0.2 | 99.4 |
| filtrate | 1.45 l | 0.4 | 3.80 | 1.96 | 53.0 | nil | 0.2 | 82.1 | 83.0 | 30.5 | nil |

EXAMPLE 3

The steps of Example 2 using a concentrate of similar composition were repeated using ground concentrate slurried with a feed solution containing 71 g/l sulphuric acid, as well as 23 g/l copper as cupric ion and 4 g/l iron as ferrous ion. The results are tabulated in Table III.

TABLE I

| material | weight or volume | assay in % or g/l | | | | | distribution in % of concentrate | | | | |
|---|---|---|---|---|---|---|---|---|---|---|---|
| | | Cu | Ni | Co | Fe | Pb | Cu | Ni | Co | Fe | Pb |
| Feed concentrate | 1000 g | 25.8 | 0.67 | 0.37 | 25.2 | 11.6 | 100 | 100 | 100 | 100 | 100 |
| Flotation concentrate | 720 g | 25.5 | 0.15 | 0.084 | 27.5 | 4.0 | 71.2 | 16.2 | 16.1 | 78.5 | 24.9 |
| tailings | 280 g | 3.4 | 0.046 | 0.019 | 18.8 | 31.0 | 3.7 | 1.9 | 1.3 | 20.8 | 75.0 |
| filtrate | 1.4 l | 46.3 | 3.9 | 2.2 | 1.2 | nil | 25.1 | 81.9 | 82.6 | 0.7 | nil |

EXAMPLE 2

The steps of Example 1 using a concentrate of similar composition were repeated with a precipitation leach prior to flotation. 1000 g. of the ground concentrate was slurried with 1.5 of a feed solution containing 145 g/l sulphuric acid. The slurry was subjected to an oxi- It will be evident from a comparison of results shown in Tables II and III that the use of a copper ioncontaining solution in the oxidation leach of Example 3 has improved the extraction of nickel and cobalt to 87.4 and 85.6% respectively.

TABLE III

| material | weight or volume | assay in % or g/l | | | | | distribution in % of concentrate | | | | |
|---|---|---|---|---|---|---|---|---|---|---|---|
| | | Cu | Ni | Co | Fe | Pb | Cu | Ni | Co | Fe | Pb |
| Feed concentrate | 1000 g | 27.0 | 0.65 | 0.36 | 25.4 | 11.4 | 100 | 100 | 100 | 100 | 100 |
| solution | 2.1 l | 23.0 | nil | nil | 4.0 | nil | 17.8 | — | — | 3.3 | — |
| Flotation concentrate | 743 g | 42.5 | 0.11 | 0.07 | 20.7 | 0.4 | 116.9 | 12.6 | 14.4 | 62.5 | 2.6 |
| tailings | 166 g | 0.2 | <0.005 | <0.005 | 0.2 | 66.8 | 0.1 | tr. | tr. | 0.1 | 97.4 |

TABLE III-continued

| material | weight or volume | assay in % or g/l | | | | | distribution in % of concentrate | | | | |
|---|---|---|---|---|---|---|---|---|---|---|---|
| | | Cu | Ni | Co | Fe | Pb | Cu | Ni | Co | Fe | Pb |
| filtrate | 2.38 l | 0.93 | 2.39 | 1.29 | 42.1 | nil | 0.8 | 87.4 | 85.6 | 40.7 | nil |

EXAMPLE 4

This example illustrates the effects, in the oxidation leach of the concentrate, of temperature, partial pressure of oxygen and the addition of a copper sulphate solution on the extraction of cobalt and nickel. A series of tests was performed using a concentrate of similar composition as used in previous examples. The results of these tests are given in Table IV.

TABLE IV

| temp. °C | partial pressure $O_2$ psi | retention time hours | Cu++ added g/l | leach residue % Co | leach residue % Ni | extraction Co and Ni % |
|---|---|---|---|---|---|---|
| 110 | 100 | 2 | nil | 0.10 | 0.18 | 68.8 |
| 110 | 100 | 2 | 25 | 0.08 | 0.15 | 74.1 |
| 115 | 100 | 2 | 23 | 0.08 | 0.15 | 75.3 |
| 115 | 100 | 2 | 54 | 0.06 | 0.12 | 80.8 |
| 115 | 200 | 2 | 23 | 0.05 | 0.08 | 86.9 |
| 115 | 200 | 2 | 54 | 0.03 | 0.06 | 94.0 |

The results show that raising the temperature of the oxidation leach from 110° to 115° C., raising the partial pressure of oxygen from 100 to 200 p.s.i. and adding cupric ions in an amount of up to 54 g/l improve the extraction of cobalt and nickel from the concentrate from 68.8% to 94.0%.

EXAMPLE 5

This example illustrates the preferred embodiment of the process as shown in the flowsheet of FIG. 2. 1000 g. of a matte with a particle size of minus 20 mesh was leached with a sulfuric acid solution containing a small amount of ferrous ion for 2 hours at 115° C. and under 100 p.s.i. partial pressure of oxygen. The leach slurry was filtered, the solids residue washed, and leach filtrate and wash water were combined. The washed residue forms a lead concentrate. Amounts, assays, and distribution of values in matte, residue and filtrate are compiled in Table V.

TABLE V

| material | amount | unit | Cu | Pb | Fe | Ni | Sb | As | S | Ag |
|---|---|---|---|---|---|---|---|---|---|---|
| Feed | | | | | | | | | | |
| matte | 1000 g | % | 45.5 | 31.1 | 0.2 | 1.37 | 0.5 | 3.1 | 14.4 | 33* |
| acid solution | 4.5 l | g/l | | | 5.0 | | | | 188 ($H_2SO_4$) | |
| Leach Products | | | | | | | | | | |
| residue (concentrate) | 709 g | % | 2.1 | 43.9 | 2.8 | 0.025 | 0.61 | 4.0 | 27.5 | 46.5* |
| distribution on original matte | | % | 3.3 | 100 | — | 1.3 | 88.1 | 91.6 | — | 100 |
| filtrate | 5.9 l | % | 74.6 | nil | 0.75 | 2.3 | 0.10 | 0.44 | 5.0 ($H_2SO_4$) | nil |

*amount in ounces per ton of matte 1000 g. of a concentrate was treated in an oxidation leach for 2 hours at 115° C. and a partial pressure of oxygen of 200 p.s.i. with 2.1 of a copper sulphate solution. The copper sulphate solution, made up of the leach filtrate from the matte, some leach filtrate from a previous precipitation leach test, residual solution and sulphuric acid, contained 54 g/l Cu, 4.0 g/l Fe and 50 g/l free acid, as well as the small amounts of nickel, cobalt, arsenic and antimony which were present in the various make-up solutions.

The reaction mixture from the oxidation leach was subjected to a precipitation leach for 2 hours at 170° C. followed by froth flotation, as shown in the flowsheet, without addition of reagents. The temperature of the flotation was about 70° C.

The flotation filtrates, after liquid-solids separations and washing of the flotation concentrates and tailings, which were separately recovered, were combined and treated with 164 g. of limerock (52% CaO) to raise the pH to 2.0. After filtering the resulting slurry, the filtrate was treated at atmospheric pressure and at a temperature of 75° C. with air to precipitate iron as hydrated iron oxide (goethite). 62 g. of lime was added to raise the pH and to maintain it at a value of 2.7. The resulting solution, after removal of the precipitated iron, was treated with hydrogen sulphide gas at a temperature of 60° C. and under atmospheric pressure to precipitate cobalt and nickel as sulphides. Ammonium hydroxide was added to maintain the pH at a value of 3. The compositions of the various fractions are listed in Table VI.

TABLE VI

| | Cu | Pb | Fe | Ni | Co | S | Ag | Zn | free acid |
|---|---|---|---|---|---|---|---|---|---|
| Feed | | | | | | | | | |
| concentrate % | 29.0 | 10.5 | 26.7 | 0.80 | 0.50 | 32.2 | 1.5* | 0.3 | — |
| Flotation | | | | | | | | | |
| concentrate % | 47.0 | 0.4 | 15.6 | 0.13 | 0.10 | 30.9 | 1.75* | — | — |
| tailings % | 0.2 | 67.0 | 0.2 | 0.01 | 0.01 | — | nil | — | — |
| filtrate g/l | 0.6 | nil | 67.4 | 3.3 | 2.0 | — | nil | — | 72.0 |
| Limestone Neutralization | | | | | | | | | |
| residue % | Tr. | nil | 1.1 | 0.01 | 0.01 | — | nil | — | — |
| filtrate g/l | 0.6 | nil | 65.9 | 3.3 | 2.0 | — | nil | — | 1.0 |
| Iron Precipitation | | | | | | | | | |
| residue % | 0.17 | nil | 21.3 | 0.10 | 0.06 | — | nil | — | — |
| filtrate g/l | 0.1 | nil | 5.0 | 3.6 | 1.8 | — | nil | 1.4 | Tr. |

TABLE VI-continued

|  | Cu | Pb | Fe | Ni | Co | S | Ag | Zn | free acid |
|---|---|---|---|---|---|---|---|---|---|
| Cobalt & Nickel Precipitation |  |  |  |  |  |  |  |  |  |
| residue % | 0.1 | nil | 8.0 | 25.4 | 18.5 | 34 | nil | 12.3 | — |
| residual solution g/l | nil | nil | 4.0 | 0.005 | 0.005 | — | nil | nil | Tr. |

*in ounces per ton

The arsenic in the solution from the matte leaching, which is present in the copper sulphate solution added to the oxidation leach, is precipitated with the goethite while the antimony reports in the flotation tailings and the nickel reports in the nickel precipitate.

The treatment of the matte and the concentrate resulted in the recovery, in addition to the lead concentrate obtained from the matte as shown in Table V, of a second lead concentrate (flotation tailings), a copper concentrate (flotation concentrate), a cobalt and nickel concentrate, a gypsum precipitate and an iron precipitate. The distribution of values in each of the concentrates and the precipitates is tabulated in Table VII.

TABLE VII

|  | Cu | Pb | Fe | Ni | Co in % | Sb | As | S | Zn | Ag |
|---|---|---|---|---|---|---|---|---|---|---|
| lead concentrate | 0.1 | 97.0 | 0.1 | 0.2 | 0.3 | 100 | — | — | — | — |
| copper concentrate | 99.5 | 3.0 | 50.0 | 14.0 | 16.9 | — | — | 82 | — | 100 |
| cobalt, nickel concentrate | 0.1 | nil | 0.7 | 77.9 | 74.8 | — | — | 18 | 100 | — |
| gypsum precipitate | nil | nil | 1.3 | 0.4 | 0.6 | — | — | — | — | — |
| iron precipitate | 0.3 | nil | 47.9 | 7.5 | 7.2 | — | 100 | — | — | — |
|  | 100 | 100 | 100 | 100 | 100 | 100 | 100 | 100 | 100 | 100 |

What we claim as new and desire to protect by Letters Patent of the United States is:

1. A process for treating concentrates of sulphides of copper, zinc, nickel, cobalt, lead and iron for selectively concentrating said metal values into separate fractions, which comprises: slurrying said sulphides in an acidic solution containing from about 10 to 70 g/l sulphuric acid and subjecting said slurry to an oxidation leach at an oxygen partial pressure in the range of from about 50 to 200 p.s.i. and a temperature in the range of from about 70° C. to the melting point of sulphur for leaching of cobalt and nickel values and for formation of insoluble lead sulphate, subjecting the reaction mixture from the oxidation leach to a precipitation leach under autogenous pressure in the absence of free oxygen and at a temperature of from about 140° to 190° C. for precipitation of soluble copper as insoluble simple copper sulphide and leaching of iron as ferrous sulphate, subjecting the reaction mixture from the precipitation leach to a differential flotation for the separate recovery of a lead sulphate concentrate and a copper sulphide concentrate from the solution, precipitating iron from said solution as a compound chosen from the group consisting of goethite, hematite, basic sulfate and jarosite, removing precipitated iron from solution and recovering zinc and cobalt and nickel as sulfides.

2. A process as claimed in claim 1 which additionally comprises slurrying a copper-containing matte in an aqueous solution of sulphuric acid containing from about 2 to 10 g/l iron as ferrous ion and subjecting said slurry to an oxidation leach at an oxygen partial pressure in the range of from about 100 to 200 p.s.i. at a temperature in the range of from about 100° to 115° C., said slurry having sufficient sulphuric acid to leach any copper, cobalt, nickel and zinc values as soluble metal sulphates, precipitate lead as lead sulphate and provide a residual acid content of from about 5 to 20 g/l, separating solids containing said lead sulphate from solution, and feeding at least a portion of said solution containing copper sulphate to the sulphides oxidation leach.

3. A process as claimed in claim 2, in which at least a portion of said solution containing copper sulphate is fed to the precipitation leach.

4. A process as claimed in claim 2, in which said aqueous solution of sulphuric acid contains from about 2 to 5 g/l iron as ferrous ion.

5. A process as claimed in claim 1, in which the acidic solution also contains about 20 to 80 g/l copper as cupric ion.

6. A process as claimed in claim 1, in which the partial pressure of oxygen in the sulphides oxidation leach is maintained in the range of from about 100 to 200 p.s.i.

7. A process as claimed in claim 1, in which the temperature in the sulpides oxidation leach is maintained in the temperature of from about 90° to 115° C.

8. A process as claimed in claim 1, in which the temperature in the precipitation leach is maintained in the range of from about 150° to 180° C.

9. A process as claimed in claim 1, in which the pH of the solution from the differential flotation is raised to from about 1.5 to 2.0 by the addition of limestone prior to iron precipitation whereby gypsum is precipitated and removing said gypsum from solution.

10. A process as claimed in claim 9, in which iron in the solution is precipitated as goethite, after removal of gypsum, by maintaining in the solution from about 0.5 to 1.0 g/l copper as cupric ion and adding sufficient lime to raise or maintain the solution pH to from about 2.0 to 3.5, the solution is agitated at a temperature in the range of from about 60° to 95° C. in the presence of air and precipitated iron is separated from solution.

11. A process as claimed in claim 9, in which iron in the solution is precipitated as goethite, after removal of gypsum, by maintaining in the solution from about 0.5 to 1.0 g/l copper as cupric ion and adding sufficient lime to raise or maintain the solution pH to from about 2.6 to 2.9, the solution is agitated at a temperature of about 75° C. in the presence of air and precipitated iron is separated from solution.

12. A process as claimed in claim 1, in which iron is precipitated from the solution from the differential flotation as a basic sulphate or hematite by heating the solution to a temperature in the range of from about 140° to 230° C. in the presence of an oxygen-bearing gas at an oxygen partial pressure of from about 50 to 200 p.s.i. and precipitated iron is separated from solution.

13. A process as claimed in claim 1, in which iron is precipitated from the solution from the differential flotation as a jarosite by heating the solution to a temperature in the range of from about 140° to 230° C. in the presence of an alkali metal or ammonia and an oxygen-bearing gas at an oxygen partial pressure of from about 50 to 200 p.s.i. and precipitated iron is separated from solution.

14. A process as claimed in claim 1, in which the cobalt and nickel are precipitated from the solution as sulphides, after removal of precipitated iron, at a temperature of from about 50° C, to the solution boiling point at a pH of from about 1.8 to 4.5 by adding to the solution one of the group consisting of hydrogen sulphide gas, sodium sulphide and ammonium sulphide and precipitated cobalt and nickel are separated from the solution to form a residual solution.

15. A process as claimed in claim 2, in which residual solution containing iron as ferrous ion is recycled from the cobalt and nickel precipitation to the matte oxidation leach.

16. A process as claimed in claim 1, in which the cobalt and nickel are precipitated from the solution as sulphides, after removal of precipitated iron, at a temperature of from about 60° to 70° C. at a pH of from about 2.5 to 3.0 by adding to the solution one of the group consisting of hydrogen sulphide gas, sodium sulphide and ammonium sulphide and precipitated cobalt and nickel are separated from the solution.

17. A process as claimed in claim 14, in which the zinc is precipitated from the solution as zinc sulphide at ambient temperature and ambient pressure prior to the precipitation of cobalt and nickel by adding hydrogen sulphide gas to the solution.

18. A process as claimed in claim 1, in which the concentrate is ground so that from about 90 to 100% by weight of ground concentrate passes a 325 mesh screen.

19. A process for treating concentrates of sulphides of copper, zinc, nickel, cobalt, lead and iron and a particulate copper-containing matte for selectively concentrating said metal values into separate fractions which comprises the steps of: p1 a. slurrying said concentrates in an acidic solution containing in an acidic solution containing about 10 to 70 g/l sulphuric acid and about 20 to 80 g/l copper as cupric ion and subjecting the slurry to an oxidation leach at an oxygen partial pressure in the range of about 50 to 200 psi and a temperature in the range of about 70° C. to the melting point of sulphur for leaching cobalt and nickel values and for formation of leading sulphate;
   b. slurrying said particulate copper-containing matte in an aqueous solution of sulphuric acid containing about 2 to 10 g/l iron as ferrous ion and subjecting the slurry to an oxidation leach at an oxygen partial pressure in the range of about 100 to 200 psi and a temperature in the range of about 100° to 115° C., said slurry having sufficient sulphuric acid to leach copper and any cobalt, nickel and zinc values, precipitate any lead as lead sulphate and provide a residual acid content of about 5 to 20 g/l, separating solids containing lead sulphate from the solution and feeding at least a portion of said solution containing copper sulphate to the oxidation leach of step (a);
   c. subjecting the reaction mixture from the oxidation leach of step (a) to precipitation leach under autogenous pressure in the absence of free oxygen and at a temperature in the range of about 140° to 190° C. for precipitation of soluble copper as insoluble simple copper sulphide and leach of iron as ferrous sulphate;
   d. subjecting the reaction mixture from the precipitation leach to differential flotation for separate recovery of a lead sulphate concentrate and a copper sulphide concentrate from the solution;
   e. raising the pH of the solution from the differential flotation to from about 1.5 to 2.0 by the addition of limestone whereby gypsum is precipitated and removing said gypsum from solution;
   f. precipitating iron in the solution as goethite, after removal of gypsum, by maintaining in the solution about 0.5 to 1.0 g/l copper as cupric iron, adding sufficient lime to raise or to maintain the solution pH in the range of about 2.0 to 3.5, agitating the solution at a temperature in the range of about 60° to 95° C. in the presence of air and removing precipitated iron from the solution; and
   g. precipitating cobalt and nickel from the solution as sulphides, after removal of precipitated iron, at a temperature in the range of about 50° C. to the solution boiling point at a pH in the range of about 1.8 to 4.5 by adding to the solution one of the group consisting of hydrogen sulphide gas, sodium sulphide and ammonium sulphide, and recovering a cobalt and nickel concentrate from residual solution.

20. A process for treating concentrates of sulphides of copper, zinc, nickel, cobalt, lead and iron and a particulate copper-containing matte for selectively concentrating said metal values into separate fractions which comprises the steps of:
   a. grinding said concentrates so that about 90 to 100% by weight of concentrates passes a 325 mesh screen;
   b. slurrying ground concentrates in an acidic solution containing about 10 to 70 g/l sulphuric acid and about 20 to 80 g/l copper as cupric iron and subjecting the slurry to an oxidation leach at an oxygen partial pressure in the range of about 100 to 200 psi and a temperature in the range of about 90° to 115° C. for leaching of cobalt and nickel values and for formation of lead sulphate;
   c. grinding said matte to a particle size to less than 10 mesh;
   d. slurrying ground copper-containing matte in an aqueous solution of sulphpuric acid containing about 2 to 5 g/l iron as ferrous ion and subjecting the slurry to an oxidation leach at an oxygen partial pressure in the range of about 100 to 200 psi and a temperature in the range of about 100° to 115° C., said slurry having sufficient sulphuric acid to leach copper and any cobalt, nickel and zinc values, precipitate any lead as lead sulphate and provide a residual acid content of about 5 to 20 g/l, separating solids containing lead sulphate from the solution and feeding at least a portion of said solution containing copper sulphate to the oxidation leach of step (b);
   e. subjecting the reaction mixture from the oxidation leach of step (b) to a precipitation leach under autogenous pressure in the absence of free oxygen and at a temperature in the range of about 150° to 180° C. for precipitation of soluble copper as insoluble simple copper sulphide and leaching of iron as ferrous sulphate;

f. subjecting the reaction mixture from the precipitation leach to differential flotation for separate recovery of a lead sulphate concentrate and a copper sulphide concentrate from the solution;

g. raising the pH of the solution from the differential flotation to from about 1.5 to 2.0 by the addition of limestone whereby gypsum is precipitated and removing said gypsum from solution;

h. precipitating iron in the solution as goethite, after removal of gypsum, by maintaining in the solution about 0.5 to 1.0 g/1 copper as cupric ion, adding sufficient lime to raise or to maintain the solution pH in the range of about 2.6 to 2.9, agitating the solution at a temperature of about 75° C. in the presence of air and removing precipitated iron from the solution;

i. precipitating copper and zinc from the solution as sulphides, after removal of precipitated iron, at ambient temperature and ambient pressure by adding hydrogen sulphide gas to the solution and recovering precipitated copper and zinc from the solution; and j. precipitating cobalt and nickel from the solution as cobalt and nickel sulphides, after recovering precipitated copper and zinc, at a temperature in the range of about 60° to 70° C. at a pH in the range of about 2.5 to 3.0 by adding to the solution one of the group consisting of hydrogen sulphide gas, sodium sulphide and ammonium sulphide, and recovering a cobalt and nickel concentrate from residual solution.

21. A process as claimed in claim 20, in which at least a portion of the solution obtained in step (d) is fed to the precipitation leach of step (e).

22. A process as claimed in claim 20, in which residual solution containing iron as ferrous ion from the cobalt and nickel precipitation step (j) is recycled to the matte oxidation leach of step (d).

* * * * *